(12) United States Patent
Bradshaw et al.

(10) Patent No.: US 8,861,169 B2
(45) Date of Patent: Oct. 14, 2014

(54) ANIMAL DEFENSE SYSTEM AND METHOD OF USE

(71) Applicant: Bradshaw Defense, LLC, Littleton, CO (US)

(72) Inventors: David L. Bradshaw, Littleton, CO (US); W. Matthew Bradshaw, Spicewood, TX (US)

(73) Assignee: Bradshaw Defense, LLC, Littleton, CO (US)

( * ) Notice: Subject to any disclaimer, the term of this patent is extended or adjusted under 35 U.S.C. 154(b) by 95 days.

(21) Appl. No.: 13/776,382

(22) Filed: Feb. 25, 2013

(65) Prior Publication Data

US 2014/0240890 A1 Aug. 28, 2014

(51) Int. Cl.
*F41B 15/04* (2006.01)
*H01T 23/00* (2006.01)

(52) U.S. Cl.
CPC ................................. *F41B 15/04* (2013.01)
USPC ....................................................... 361/232

(58) Field of Classification Search
USPC ....................................................... 361/232
See application file for complete search history.

(56) References Cited

U.S. PATENT DOCUMENTS

| | | | |
|---|---|---|---|
| 3,885,733 A | 5/1975 | Klebold et al. | |
| 3,998,459 A | 12/1976 | Henderson et al. | |
| 4,093,969 A | 6/1978 | Maynor, Jr. | |
| 4,153,009 A | 5/1979 | Boyle | |
| 4,240,454 A * | 12/1980 | Tsai ................................. | 135/24 |
| 4,719,534 A | 1/1988 | Ward | |
| 4,860,776 A * | 8/1989 | McQuain ....................... | 135/19.5 |
| 5,065,904 A | 11/1991 | McCaffrey et al. | |
| 5,193,048 A | 3/1993 | Kaufman et al. | |
| 5,282,332 A | 2/1994 | Philips | |
| 5,388,603 A | 2/1995 | Bauer et al. | |
| 5,467,247 A | 11/1995 | de Anda et al. | |
| 5,477,431 A | 12/1995 | Curameng, Jr. | |
| 5,986,872 A * | 11/1999 | Chaput ........................... | 361/232 |
| 6,091,597 A | 7/2000 | Lin | |
| 6,125,595 A | 10/2000 | Showalter | |
| 6,199,412 B1 | 3/2001 | Kennedy | |
| 6,404,613 B1 | 6/2002 | Dowling et al. | |
| 6,643,114 B2 | 11/2003 | Stethem | |
| 6,779,490 B1 | 8/2004 | Betzen | |
| 6,791,816 B2 | 9/2004 | Stethem | |
| 6,807,762 B1 | 10/2004 | Edwards | |
| 6,823,621 B2 | 11/2004 | Gotfried | |
| D521,229 S * | 5/2006 | Mariano .............................. | D3/5 |

(Continued)

FOREIGN PATENT DOCUMENTS

WO    WO 2009/134341    11/2009

OTHER PUBLICATIONS

International Search Report and Written Opinion for International (PCT) Patent Application No. PCT/US2014/014998, mailed Apr. 24, 2014 8 pages.

*Primary Examiner* — Dharti Patel

(74) *Attorney, Agent, or Firm* — Sheridan Ross P.C.

(57) ABSTRACT

The present invention provides an animal defense system with one or more deterrent elements and an apparatus and method for safely deterring an animal which threatens a user. In one embodiment, the device features an electrified deterrent structure comprising arms and linkages. Further, the apparatus may be configured to operate in a variety of user-selected modes that increase effectiveness and reliability in deterring an animal which threatens a user.

20 Claims, 13 Drawing Sheets

(56) References Cited

U.S. PATENT DOCUMENTS

| | | |
|---|---|---|
| 7,174,668 B2 | 2/2007 | Locklear |
| 7,474,518 B2 | 1/2009 | Rutz et al. |
| 7,530,334 B1 | 5/2009 | Napolitano |
| 7,992,525 B1 | 8/2011 | Fischer |
| 8,154,844 B2 | 4/2012 | Brown |
| 8,231,474 B2 | 7/2012 | Stethem |
| 2009/0199884 A1 | 8/2009 | Lessing |
| 2009/0272336 A1 | 11/2009 | Cooke, Jr. et al. |

* cited by examiner

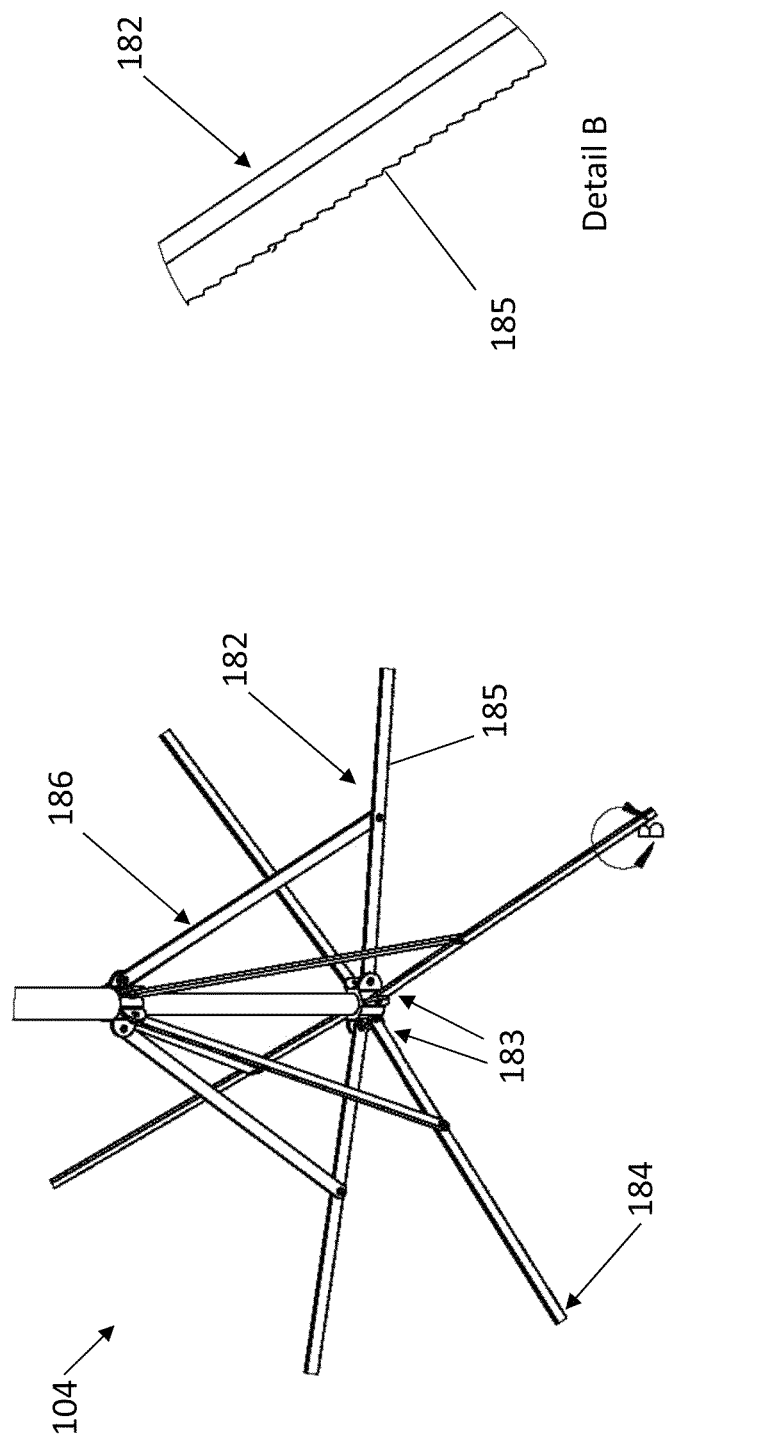

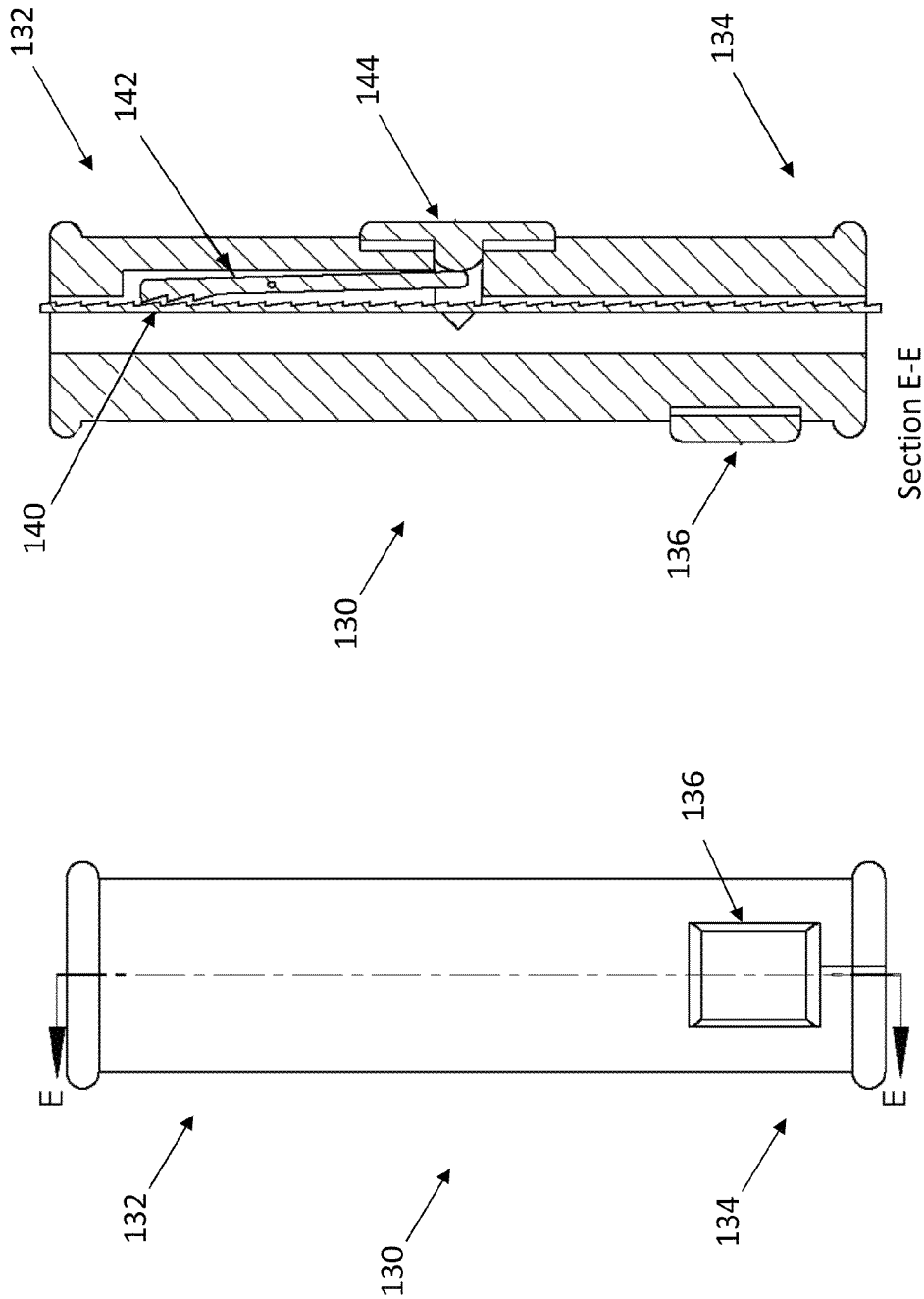

ANIMAL DEFENSE SYSTEM AND METHOD OF USE

FIELD OF THE INVENTION

Embodiments of the present invention are generally related to an animal defense system and, in particular, to an apparatus and method for safely and effectively deterring an animal which threatens a user.

BACKGROUND OF THE INVENTION

Animal attacks and threatening behaviors are a ubiquitous problem that present at best an annoyance and at worst injury or death to humans. The problem continues to grow in frequency and severity as traditional urban/rural boundaries become blurred and territories of wild animals overlap with residential developments and parks. There is therefore a need for a self-protection device to mitigate if not prevent animal attacks and threatening behaviors.

Traditional approaches to self-protection devices directed against animals have been difficult to use or transport, of limited value, or have been adapted from other applications thereby limiting their use against animals.

For example, U.S. Patent Application Publication No. 2009/0199884 to Lessing ("Lessing") published Aug. 13, 2009 discloses an electrically charged stinger contained within a walking stick, staff, cane, or hand stick. The charged stinger is selectively extended to use as a defensive device to shock attackers or wild animals. The charged stinger must directly engage the offending animal to be effective, and thus is of very limited value in most situations involving a nimble animal that may readily evade the tip of the device. Lessing is incorporated by reference in its entirety.

U.S. Pat. No. 4,719,534 to Ward ("Ward") discloses an electric shock safety device. The electric shock safety device has an extending or telescoping probe. However, Ward, like Lessing, requires its device end to directly engage the offending animal to be effective, and thus is of very limited value in most situations involving a nimble animal that may readily evade the tip of the device. Ward is incorporated by reference in its entirety.

U.S. Pat. No. 5,986,872 to Chaput ("Chaput") discloses a stunning umbrella which can be used as a conventional umbrella and for self defense. The stunning umbrella provides a stunning electrical shock when used for self defense and can also be used as a baton or striking implement. The Chaput device also requires its device end to directly engage the offending animal to be effective, and thus is of very limited value in most situations involving a nimble animal that may readily evade the tip of the device. Chaput is incorporated by reference in its entirety.

U.S. Pat. No. 4,093,969 to Maynor ("Maynor") discloses a conventional umbrella provided with a high powered electric shocking device such as used in cattle probes to provide a weapon for use against muggers and other would be attackers. The Maynor device cannot function as a walking stick or cane given ensuing damage to its high-voltage electric probes disposed at the distal tip. Furthermore, the Maynor device fails to provide any protection in the event of an electrical failure, and requires the relatively fragile structure of a conventional umbrella. Maynor is incorporated by reference in its entirety.

U.S. Pat. No. 5,388,603 to Bauer ("Bauer") discloses a multipurpose hand-held personal protection accessory disguised as a compact umbrella which serves as an umbrella, truncheon, and electronic stunner. The umbrella is housed within tubing which has conductive strips along its outer surface for the discharge of nonlethal shocks produced by a high voltage transformer contained within the tubing. The Bauer device requires its shaft or distal end to directly engage the offending animal to be effective, and thus is of very limited value in most situations involving a nimble animal that may readily evade the tip or shaft of the device. Bauer is incorporated by reference in its entirety.

U.S. Pat. No. 5,065,904 to McCaffrey ("McCaffrey") discloses a personal protection device of the hand-held type comprising a handle, a shaft and a canister section, which is adapted to receive a gas-charged canister containing a noxious compound or spray. The handle is provided with a movable trigger which, when actuated, causes the contents of the canister to discharge. McCaffrey is limited in practical use and effectiveness given time delays associated with release of its gas charge and directional sensitivities associated therein. McCaffrey is incorporated by reference in its entirety.

U.S. Pat. No. 5,477,431 to Curameng ("Curameng") discloses a personal protective device especially suited for repelling a dog from attacking a pedestrian. The device comprises a tubular holder and an expansible guard stored inside the holder. A spring urges the guard from the holder into the expanded state. When deployed, the guard opens into a generally conical configuration, which the user maneuvers over the snout of the animal. The Curameng device requires capture of an offending animal's snout into the device's distal end, and thus is of very limited value in most situations involving a nimble animal that may readily evade the tip or shaft of the device. Curameng is incorporated by reference in its entirety.

U.S. Pat. No. 6,404,613 to Dowling ("Dowling") discloses an animal stun gun that uses high voltage to stop an attacking dog or animal by touching it with the prongs of the device's staff. The charged prongs must directly engage the offending animal to be effective, and thus is of very limited value in most situations involving a nimble animal that may readily evade the tip of the device. Dowling is incorporated by reference in its entirety.

These devices and technologies do not adequately address an animal defense system and, in particular, to an apparatus and method for safely and effectively deterring an animal which threatens a user. These devices do not function to provide a self-protection device which deploys an electrified deterrent structure that when deployed, deters an offending animal from engaging or threatening a user. Furthermore, existing devices do not provide alternative and complementary deterrent features to deter an offending animal, such as an audio deterrent, an olfactory deterrent and a vibration deterrent.

Therefore, there is a long-felt need for to an apparatus and method for safely and effectively deterring an animal which threatens a user.

The present device and method of operation addresses and solves these needs. The present invention relates to an animal defense system with one or more deterrent elements and to an apparatus and method for safely deterring an animal which threatens a user. Further, the apparatus may be configured to operate in a variety of user-selected modes that increase the effectiveness and reliability in deterring an animal which threatens a user.

By way of providing additional background and context, the following references are incorporated by reference in their entireties for the purpose of explaining the nature of user defense systems and to further describe the various tools and other apparatus commonly associated therewith:

U.S. Pat. No. 7,992,525 to Fisher ("Fisher") discloses a device for controlling an animal's behavior while on a restraining device such as a leash by using the resistant force between animal and restraint to engage a trigger that activates release of a distracting or deterrent spray or gas, or a sound. The device is attached to the animal's body, with the triggering mechanism against the animal's skin. In its application as a means to train dogs to walk on a loose leash, the trigger may be situated inside a collar, such that triggering occurs when the dog pulls the leash taut. Triggering can also occur if the user pulls back on the leash to administer a correction.

U.S. Pat. No. 6,091,597 to Lin ("Lin") discloses an electric shock device comprising a handle and a plurality of retractable rod portions. The handle has an interior accommodating therein a high voltage generator and a battery unit. The handle further has a control switch at a lower rim thereof. The retractable rod portions are arranged and assembled in order of size, and equipped with a retractable function by utilizing springs and retaining rods disposed therein. The rod portions are made of insulating materials and respectively provided with parallel positive and negative electrode plates on both sides thereof. The electrode plates nearest to the handle are connected to positive and negative terminals of the high voltage generator so as to supply the rod portions with the required high voltages. The permittivity of dielectrics on the rod portions that have different diameters is caused to be equivalent so that the conductance conditions of the rod portions are the same, and the rod portions can all generate electric arcs.

U.S. Pat. No. 8,154,844 to Brown ("Brown") discloses a personal defense device that includes a shield member configured to be worn over at least a third of a length of a user's forearm, the forearm being bounded by the user's wrist and elbow, the length being measured from the wrist to the elbow, the shield member conforming closely to the outer surface counters of a forearm, and a portable source of electricity. The shield member includes an electrical shock bar configured to receive an electrical current from the electrical source and to deliver an electrical shock to a human or other animal.

U.S. Pat. No. 7,530,334 to Napolitano ("Napolitano") discloses a shock absorber device for attachment to a dog leash comprising a shock absorber body made of lightweight flexible resilient tubular polymer material which will not cause injury when struck by it. The body has a stop in each end and two compression springs within the tubular body between the stops. Tension cables are attached to the compression springs and do not pneumatically engage within the tubular polymer body and extend out of the body and respectively carry a snap hook for attachment to a dog collar and a ring for attachment to a dog leash. Pull on the tension members causes compression of the springs to reduce shock-loading on the dog walker. After the springs are pulled solid, the resiliency of the body continues to absorb shock.

U.S. Pat. No. 6,779,490 to Betzen ("Betzen") discloses a system to deter pest animals, particularly deer, from a protected area. The system comprises a portable, wireless, shock producing, animal repelling and training device having two or more bare electrodes and having an electrode separator which maintains the electrodes in close proximity to each other and insulated from each other, while allowing full exposure of the electrodes to the target animal and while greatly reducing the chances that the device will be discharged by the electrodes contacting each other or by precipitation. The animal control device is deployed such that the target pest animals in the protected area will be attracted to touch the device and so will contact the electrodes, receive an electric shock, and be frightened from the area. Target animals will then continue to avoid the protected area because of a scarecrow effect provided by the presence of the device.

U.S. Pat. No. 6,125,595 to Showalter ("Showalter") discloses an electrical shocking device to deter pests, such as squirrels attempting access to birdfeeders. The insulated electrical shock tube comprises a hollow voltage insulating tube with exterior surface criss-crossed with a bare secured electrical circuit insulated at disposed areas, and a power supply connector providing electrical shock stimuli to animals when contact is made to the bare secured electrical circuit surrounding the insulated tube secured to support pole of birdfeeder. Showalter is incorporated by reference in its entirety.

U.S. Patent Application Publication No. 2009/0272336 to Cooke ("Cooke I") and International Patent Application Publication No. WO2009/134341 to Cooke ("Cooke II") disclose a wound disturbance protection device comprising a small replaceable battery of about three volts, and utilizes a circuit board containing a micro-controller, a sensible voltage output circuit, which may have a direct current or an alternating current output, and an extended tongue or other structure touch circuit having a replaceable flexible adhesive backed electrical circuit. The circuit board may be removable from the flexible adhesive backed electrical touch circuit. The bandage protector includes embodiments which may be attached in a spiral fashion, an adhesively attached fashion or in an overlapping fashion, and in a number of specialized shapes for special service on an animal, including breathing holes and incision openings. The applied shock is only external to the bandage and will thus be localized to the animal's sense organs on touch and will avoid any possibility of current and voltage coursing through other parts of the animal's body.

U.S. Pat. No. 7,174,668 to Locklear ("Locklear") discloses a control device for marine animals comprising an electrical device that applies an electrical voltage directly to a marine animal in order to shock the marine animal. The device preferably comprises a pole or rod having electrical prongs at one end which may be applied to the marine animal, thereby applying and electrical signal having a voltage, amperage and frequency that stuns and/or shocks the animal. The character of the electrical signal is such that the animal is temporarily paralyzed, so that it may be safely handled by humans for bringing it into a watercraft without otherwise damaging the animal.

U.S. Pat. No. 4,153,009 to Boyle ("Boyle") discloses an electric shock protective device for animals to protect, for example, a bandage affixed to one of the animal's legs. The device is positioned on or around the bandage, and if the animal attempts to bite or chew on the bandage, or the sore or wound on its leg, its mouth and tongue will come into contact with the protective device causing it to produce a mild electric shock. The device includes a flexible mounting band dimensioned to surround the leg of an animal for which it is intended, a plurality of electrical conductors such as thin copper bus bars mounted thereon in a parallel relationship, an electrical power source such as electrically connected batteries, and a first and second electrical conductor. The electrical conductors face outwardly when the protective device is wrapped around the bandaged leg, whereby the animal's tongue or mouth contacts both the first and second conductors which completes an electrical circuit and produces an electrical shock to the portion of the tongue or mouth in contact with the conductors. More than two conductors may be mounted in parallel spaced apart relationship on the flexible mounting band, in which case they are connected so each adjacent one is of opposite polarity.

SUMMARY OF THE INVENTION

It is one aspect of the present invention to provide an animal defense system with one or more deterrent elements and an apparatus and method for safely deterring an animal which threatens a user. In one embodiment of the invention, the apparatus is configured to operate in a variety of user-selected modes that increase effectiveness and reliability in deterring an animal which threatens a user. When one or more deterrent elements of the device are deployed or activated, an animal threat to a user is mitigated if not eliminated. The device includes a deterrent structure that is deployable and controllable by a user, for example through a control button on a handle of the device. The deterrent structure includes deterrent structure arms and deterrent structure linkages. Other deterrents comprise electrical, vibration, audio and olfactory.

The phrase "olfactory" is used herein to indicate sense of smell and technologies associated therein.

The phrase "removably attached" and/or "detachable" is used herein to indicate an attachment of any sort that is readily releasable.

The phrases "stowed", "retracted", "un-deployed", and/or "not deployed" are used herein to indicate a state of the device in which a feature, such as a deterrent structure, is not activated, extended or otherwise engaged.

The phrases "extended" and/or "deployed" are used herein to indicate a state of the device in which a feature, such as a deterrent structure, is activated, extended or otherwise engaged.

The phrase "in communication with" and/or "interconnected with" and/or "engaged with" are used herein to indicate a state in which two components connect with one another.

The phrase "dog" and/or "canine" are used to indicate the canine animal species.

The phrase "offending animal" is used to indicate any animal that threatens a user, to include but not limited to dogs, cougars, coyotes, skunks, raccoons, and foxes.

In one embodiment of the invention, a self-protection device for a user against an offending animal is provided, the device comprising: a substantially hollow outer shaft portion having a proximal end and distal end; a control handle interconnected to the proximal end of the outer shaft, the control handle having a controller, a lower inner shaft portion slideably engaged axially with the distal end of the outer shaft; and a deterrent structure connected to the lower inner shaft portion and having a plurality of arms and linkages; wherein the controller has a first switch to activate the deterrent structure in at least one of two deterrent structure states including an electrified state and an unelectrified state, the lower inner shaft portion extending distally from the outer shaft upon activating the deterrent structure, and the arms expanding radially from the lower inner shaft upon activating the deterrent structure.

In another embodiment of the invention, a self-protection device for a user against an offending animal is provided, the device comprising: a substantially hollow outer shaft portion having a proximal end and distal end; a control handle interconnected to the proximal end of the outer shaft, the control handle having a controller, a lower inner shaft portion slideably engaged axially with the distal end of the outer shaft; a gripping handle, the gripping handle disposed adjacent the control handle; an auxiliary handle configured to deploy to a substantially perpendicular position relative to the outer shaft when the deterrent structure is deployed; a deterrent structure connected to the lower inner shaft portion and comprising at least a pair of paired structure arms and structure linkages, the structure linkages urging the structure linkages to expand radially from the lower inner shaft upon the user activating the deterrent structure; a lower inner shaft portion interconnected to the distal end of the outer shaft, the lower inner shaft slideably engaged axially with the outer shaft, the lower inner shaft extending distally from the outer shaft upon the user activating the deterrent structure; and an audio deterrent activated by the controller, the controller configured to allow a user to select at least one of a volume and a frequency of the audio deterrent; wherein the controller has a first switch to activate the deterrent structure in at least one of two deterrent structure states including an electrified state and an unelectrified state, the lower inner shaft portion extending distally from the outer shaft upon activating the deterrent structure, and the arms expanding radially from the lower inner shaft upon activating the deterrent structure; wherein when the deterrent structure is deployed and oriented toward an offending animal, the animal is deterred from offending the user.

In one embodiment of the invention, a method of using a self-protection device for a user against an offending animal is provided, the method comprising: providing a self-protection device, the device comprising: a substantially hollow outer shaft portion having a proximal end and distal end; a control handle interconnected to the proximal end of the outer shaft, the control handle having a controller, a lower inner shaft portion slideably engaged axially with the distal end of the outer shaft; and a deterrent structure connected to the lower inner shaft portion and having a plurality of arms and linkages, wherein the controller has a first switch to activate the deterrent structure in at least one of two deterrent structure states including an electrified state and an unelectrified state, the lower inner shaft portion extending distally from the outer shaft upon activating the deterrent structure, and the arms expanding radially from the lower inner shaft upon activating the deterrent structure; positioning the distal end of the device toward an offending animal; deploying the deterrent structure by engaging the first switch of the control handle of the device; pointing the deployed deterrent structure at the offending animal; wherein when the deterrent structure is deployed and pointed toward an offending animal, the animal is deterred from offending the user.

In a preferred embodiment of the invention, a device with a grip handle and auxiliary grip handle, outer shaft and deterrent structure is provided. The device, when the deterrent structure is stowed or retracted, looks and functions as a cane or walking stick. The deterrent structure, when deployed, presents a plurality of deterrent structure arms and interconnected deterrent structure linkages at the distal end of the device. In one embodiment, six (6) pairs of deterrent structure arms and interconnected deterrent structure linkages are provided, however, in other embodiments any number of such pairs between and including three (3) to twelve (12) are provided. In some embodiments, a single deterrent structure linkage urges more than one deterrent structure arms to deploy. In one embodiment, the deterrent structure, when deployed, forms a substantially perpendicular structure, when viewed from the side, relative to the outer shaft of the device. In a preferred embodiment, the angle between the deployed deterrent structure and the outer shaft, where zero (0) degree is defined as a flush or aligned configuration, varies between approximately sixty (60) and one hundred twenty (120) degrees. In a more preferred embodiment, this defined angle between the deployed deterrent structure and the outer shaft is between approximately seventy-five (75) and one hundred five (105) degrees. In a most preferred embodiment, this defined angle between the deployed deterrent structure and the outer shaft is between approximately eighty (80) and one hundred (100) degrees.

In a preferred embodiment, when deployed, the deterrent structure radially extends from the device to a radial length of approximately between 0.5 feet and 3.5 feet.

In a more preferred embodiment, the deterrent structure radially extends from the device to a radial length approximately between 0.75 feet and 3.0 feet. In a most preferred embodiment, the deterrent structure radially extends from the device to a radial length approximately between 1.0 feet and 3.0 feet.

In one preferred embodiment, the deterrent structure of the device deploys to a stationary position within ten (10) seconds once activated, in a more preferred embodiment the deterrent structure of the device deploys to a stationary position within seven (7) seconds once activated, and in a most preferred embodiment the deterrent structure of the device deploys to a stationary position within five (5) seconds once activated.

In one preferred embodiment, the device, when the deterrent structure is undeployed, is of total axial length approximately between 3 feet and 6 feet, in a more preferred embodiment is between 3.5 feet and 5.5 feet, and in a most preferred embodiment is between 3.5 feet and 5 feet.

In one embodiment of the device, the device is manufactured of materials comprising metal, metal alloys, and composites. In one embodiment, the device is manufactured of materials comprising nonconductive, lightweight, impact-resistant materials.

In one embodiment, the deterrent structure engages a lower inner shaft, the lower inner shaft in communication and/or interconnected and/or engaged with an outer shaft and disposed axially within the outer shaft, such that the lower inner shaft may extend from within the outer shaft therein lengthening the device upon deployment of the deterrent structure and/or activation of the deployment of the deterrent structure. In another embodiment, the deterrent structure is in communication and/or interconnected and/or engaged with the outer shaft, such that when deployed the distal end of the device does not extend in length.

In one embodiment, the grip handle may be curved, such as at a ninety (90) degree angle, and may be further fitted with a gripping surface to aid gripping. The device may present as a typical walking stick with respect to aesthetics. In another embodiment, the grip handle is parallel with the outer shaft of the device, thereby presenting a substantially single straight shaft or rod.

In one embodiment, a control handle is disposed adjacent to the grip handle, and is interconnected to an upper inner shaft. The upper inner shaft is configured to axially engage the control handle at an inner diameter of the control handle. The upper inner shaft is engaged with lower inner shaft by way of the outer shaft. The upper inner shaft and lower inner shaft are configured to axially engage outer shaft at an inner diameter of outer shaft. When the deterrent structure is deployed and/or activated for deployment, the upper inner shaft extends beyond the outer shaft so as to lengthen the device. In another embodiment, when the deterrent structure is deployed or activated for deployment, the upper inner shaft does not extend beyond the outer shaft so as to lengthen the device. In one embodiment, the deterrent structure, when deployed, is configured such that the device may be rested on a substantially flat surface without tipping or falling.

In one embodiment, when the deterrent structure is activated for deployment, the device does not substantially extend in length.

In one embodiment, the device is devoid of a separate and distinct control handle relative to the grip handle, and instead the functions of the control handle are embedded in the grip handle, to include an activation means for deployment of the deterrent structure.

Another embodiment of the invention provides an auxiliary grip handle and/or a clipping means, such as an O-ring, to allow attachment of the device to a belt of a user and/or to a shoulder sling or strap fitted to a user.

In one embodiment, a deployable auxiliary handle is located adjacent to a control handle and engages and/or is interconnected with an upper inner shaft. In another embodiment, a deployable auxiliary handle is located adjacent to a handle of the device.

In one embodiment, the deterrent structure provides an electrical shock deterrent, either when stowed, when deployed, or both when stowed or deployed.

In one embodiment, an audio deterrent is disposed on an outer shaft of the device. In one embodiment, an audio deterrent is disposed at a distal end of the device. In another embodiment, an audio deterrent is disposed on the deterrent structure of the device. The audio deterrent is activated and/or controlled through the grip handle and/or the control handle. In one embodiment, a user may selectively control the volume and/or the frequency of the audio deterrent. In one embodiment, the frequency of the audio deterrent is a frequency undetectable to humans but detectable to dogs.

In one embodiment, the device is fitted with an olfactory deterrent. The olfactory deterrent comprises an odor of any type known to those skilled in the art to offend, confuse, and/or deter an animal, such as a dog. The olfactory deterrent may be disposed at the distal end of the device, to include on or near the deterrent structure. In one embodiment, the user may selectively control the amount and/or type of the olfactory deterrent.

In one embodiment, the device is fitted with a vibration deterrent, such that when the deterrent structure is stowed, the deterrent structure pulses and/or vibrates, as urged by electrical input. In another embodiment, the device is fitted with a vibration deterrent, such that when the deterrent structure is deployed, the deterrent structure pulses and/or vibrates, as urged by electrical input. In one embodiment, the user may selectively control the frequency and/or amplitude of the vibration deterrent.

In one embodiment, the device is powered by any commercially-available standard power source, comprising batteries such as alkaline, nickel cadmium, nickel metal hydride, carbon-zinc, lithium, manganese, lithium polymer, silver oxide, zinc air, and lithium ion, for example.

In one embodiment, when the deterrent structure is fully deployed, the deterrent structure arms outer end forms a diameter defining a deterrent structure sector angle between pairs of deterrent structure arms outer ends. When the deterrent structure of the device is in the process the deploying, deterrent structure arms pass through radial positions extending from coaxial with the outer shaft to approximately 90 degree with the outer shaft. Thus, the deterrent structure of the device undergoes a sequence of positions along a path of motion before stopping at a final deterrent structure arms position. The final deterrent structure position, in one embodiment, is substantially perpendicular, that is at 90 degree, from the axial or longitudinal length of the device.

In one embodiment, when the user selectively activates the deployment of deterrent structure via controller, as disposed on at least one of a grip handle and control handle, the upper inner shaft extends from outer shaft proximal end and/or lower inner shaft extends from outer shaft distal end.

In one embodiment, a controller, as disposed on at least one of a grip handle and a control handle, functions to allow a user to selectively activate and/or control at least one of the following deterrents: deterrent structure, vibration deterrent, audio deterrent, and olfactory deterrent.

In one embodiment, the device is fitted with a status display, such as a light, LED and LCD, to indicate energy or power status.

In one embodiment, the device functions as a cane and/or walking stick in addition to a self-protection device, and comprises a distal tip area that is robust to repeated ground impacts such as those encounter when the device is used as a walking stick and/or cane. In one embodiment, the device is devoid of electronics and/or electrical probes, to include electrical shock probes, at the distal tip of the device.

In one embodiment, a controller activates at least one of an electrified deterrent structure, a non-electrified deterrent structure, an audio deterrent, an olfactory deterrent and a vibration deterrent.

In one embodiment of the invention, the gripping handle may comprise a plastic material, rubber material, textured surface treatment, fabric treatment and fabric weaving. A gripping handle covering may attach to the device as a permanent or fixed feature of the device or may be removable. Means to enable a removable gripping element may comprise snaps, zippers and any reclosable bond such as Velcro™.

In another embodiment of the invention, the griping handle may be made of a variety of materials, such as foamed material, gel, latex, rubber, synthetic rubber, fiber-encased resinous materials, synthetic materials, polymers, natural materials or mixtures or combinations thereof. In one embodiment, the gripping elements and/or the surface or coating of the gripping elements comprise thermoplastic polymers for example Polyvinyl Chloride (PVC), plastic polymers (also known as "poly") for example polyethylene, polyurethane and polyesterpoly, nitrile rubber (also known as Buna-N, Perbunan, or NBR) for example Nipol, Krynac and Europrene, and synthetic fibers for example Kevlar™, Nomex™ and Technora™. In another embodiment, the gripping handle and/or the surface or coating of the gripping handle comprise perforated or breathable synthetic leather, elastic textile material for example a polyurethane elastic textile such as Spandex or Lycra.

One of ordinary skill in the art will appreciate that embodiments of the present disclosure may have various sizes. The sizes of the various elements of embodiments of the present disclosure may be sized based on various factors including, for example, the size, height and/or strength of the user employing the device.

One of ordinary skill in the art will appreciate that embodiments of the present disclosure may be constructed of materials known to provide, or predictably manufactured to provide the various aspects of the present disclosure. These materials may include, for example, synthetic materials, polymers, and natural materials.

This Summary of the Invention is neither intended nor should it be construed as being representative of the full extent and scope of the present disclosure. The present disclosure is set forth in various levels of detail in the Summary of the Invention as well as in the attached drawings and the Detailed Description of the Invention, and no limitation as to the scope of the present disclosure is intended by either the inclusion or non-inclusion of elements, components, etc. in this Summary of the Invention. Additional aspects of the present disclosure will become more readily apparent from the Detailed Description, particularly when taken together with the drawings.

The above-described benefits, embodiments, and/or characterizations are not necessarily complete or exhaustive, and in particular, as to the patentable subject matter disclosed herein. Other benefits, embodiments, and/or characterizations of the present disclosure are possible utilizing, alone or in combination, as set forth above and/or described in the accompanying figures and/or in the description herein below. However, the Detailed Description of the Invention, the drawing figures, and the exemplary claims set forth herein, taken in conjunction with this Summary of the Invention, define the invention.

BRIEF DESCRIPTION OF THE DRAWINGS

The accompanying drawings, which are incorporated in and constitute a part of the specification, illustrate embodiments of the disclosure and together with the general description of the disclosure given above and the detailed description of the drawings given below, serve to explain the principles of the disclosures.

FIG. 4A is a partial perspective view of an embodiment of the distal portion of the device with deterrent structure in a deployed configuration;

FIG. 4B is a partial close-up view of an embodiment of portion B of FIG. 4A;

FIG. 5A is a side view of an embodiment of the control handle element of the device;

FIG. 5B is a cross-sectional view of Section E-E of FIG. 5A, detailing an embodiment of the control handle element of the device;

Figure 1A:
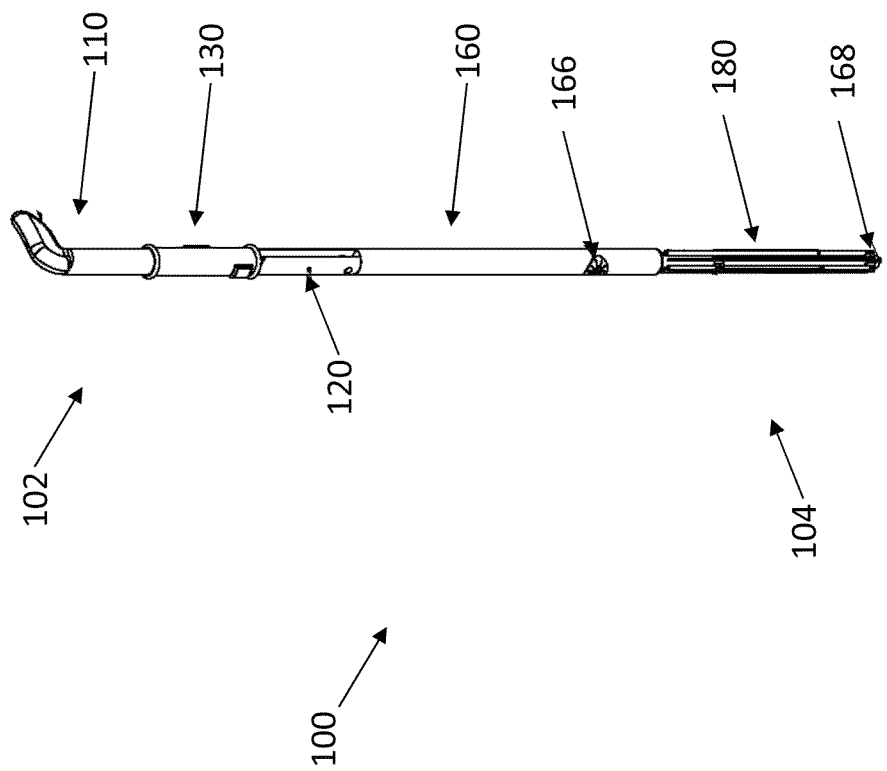
FIG. 1A is a perspective view of an embodiment of the device with deterrent structure in a stowed configuration.
Figure 1B:
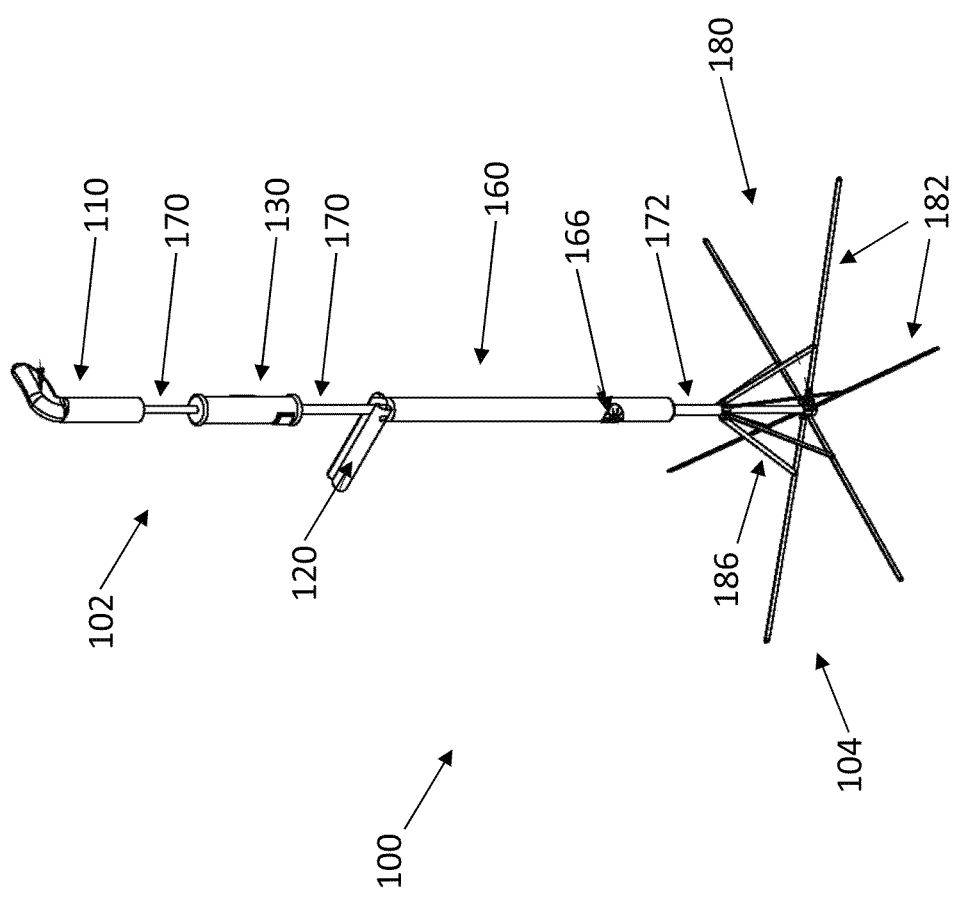
FIG. 1B is a perspective view of an embodiment of the device with deterrent structure in an extended configuration.

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

The present invention relates to an animal defense system with one or more deterrent elements and to an apparatus and method for safely deterring an animal which threatens a user.

Further, the apparatus may be configured to operate in a variety of user-selected modes that increase the effectiveness and reliability in deterring an animal which threatens a user. In one embodiment of the invention, the apparatus is configured to operate in a variety of user-selected modes that increase the effectiveness and reliability in deterring an animal which threatens a user. When one or more deterrent elements of the device are deployed or activated, an animal threat to a user is mitigated if not eliminated. The device includes a deterrent structure that is deployable and controllable by a user, for example through a control button on a handle of the device. The deterrent structure includes deterrent structure arms and deterrent structure linkages. Other deterrents comprise electrical, vibration, audio and olfactory.

Referring now to FIGS. 1-7, several embodiments of the present invention are shown. In regard to FIGS. 1A-B, perspective views of an embodiment of the device with deterrent structure are provided. FIGS. 1A-B depict the device 100 with a grip handle 110 and auxiliary grip handle 120, outer shaft 160 and deterrent structure 180. FIG. 1A is a perspective view of the device 100 with deterrent structure 180 in a stowed configuration, and FIG. 1B is a perspective view of an embodiment of the device with deterrent structure 180 in an extended configuration. The device 100 includes a grip handle 110 disposed at the device proximal end 102 and a deployable deterrent structure 180 located at the device distal end 104. The deterrent structure 180 comprises a plurality of deterrent structure arms 182 and interconnected deterrent structure linkages 186 engaged and/or interconnected with a lower inner shaft 172. A control handle 130 is disposed adjacent to grip handle 110, and is interconnected to upper inner shaft 170. Upper inner shaft 170 is configured to axially engage control handle 130 at an inner diameter of control handle 130. A deployable auxiliary handle 120 is located adjacent to control handle 130 and engages and/or is interconnected with upper inner shaft 170. Upper inner shaft 170 is engaged with lower inner shaft 172 by way of the outer shaft 160. Upper inner shaft 170 and lower inner shaft 172 are configured to axially engage outer shaft 160 at an inner diameter of outer shaft 160. Audio deterrent 166 is disposed on outer shaft 160 and audio deterrent 168 at distal end of deterrent structure 180. Generally, deterrent structure 180, when stowed as depicted in FIG. 1A, forms a substantially co-axial shape with the outer shaft 160 and, when deployed, fans-out as depicted in FIG. 1B.

Figures 2A, 2B:
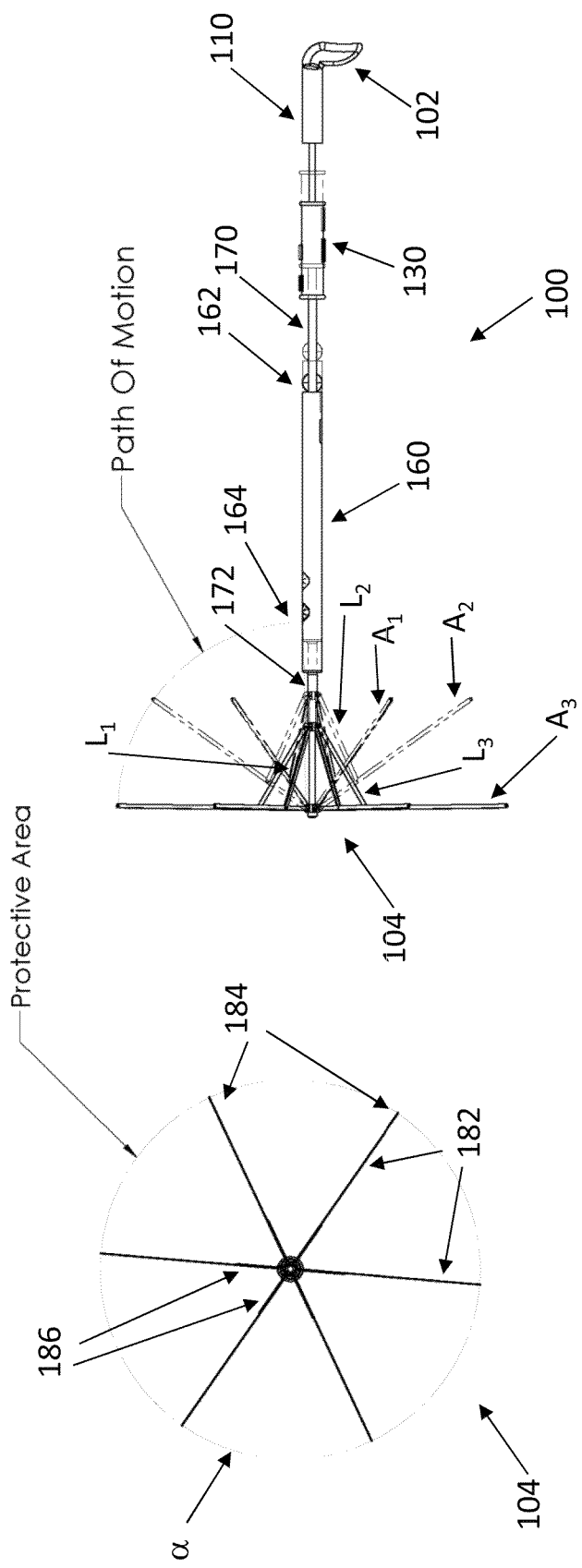
FIG. 2A is a partial bottom view of an embodiment of the device with deterrent structure in a deployed configuration.
FIG. 2B is a side view of an embodiment of the device with deterrent structure in various stages of deployment.

FIGS. 2A-B provide greater detail regarding the features and deployment of the deterrent structure. FIG. 2A is a partial bottom view of the device 100 with deterrent structure 180 in a deployed configuration, and FIG. 2B is a side view of an embodiment of the device 100 with deterrent structure 180 in various stages of deployment. When the deterrent structure 180 is fully deployed, the deterrent structure arms outer end 184 forms a diameter defining a deterrent structure sector angle α between pairs of deterrent structure arms outer ends 184. When the deterrent structure 180 of the device 100 is in the process the deploying, deterrent structure arms 182 pass through radial positions extending from coaxial with the outer shaft 160 to approximately 90 degree with the outer shaft 160 (a position shown as deterrent structure arms position 3 designated as $A_3$). As depicted in FIG. 2B, the deterrent structure 180 of the device 100 undergoes a sequence of positions along a path of motion, passing through deterrent structure arms positions 1 and 2 (designated as $A_1$ and $A_2$) before stopping at deterrent structure arms position 3 designated as $A_3$. Correspondingly, deterrent structure linkages 186, as interconnected or engaged with respective deterrent structure arms 182, pass through deterrent structure linkage positions 1 and 2 (designated as $L_1$ and $L_2$) before stopping at deterrent structure linkage position 3 designated as $L_3$. FIG. 2B also depicts the axial movements of upper inner shaft 170 and lower inner shaft 172 when the user selectively activates the deployment of deterrent structure 180 via control 130. When the user so selects activation, upper inner shaft 170 extends from outer shaft proximal end 162 and lower inner shaft 172 extends from outer shaft distal end 164.

Figure 3:
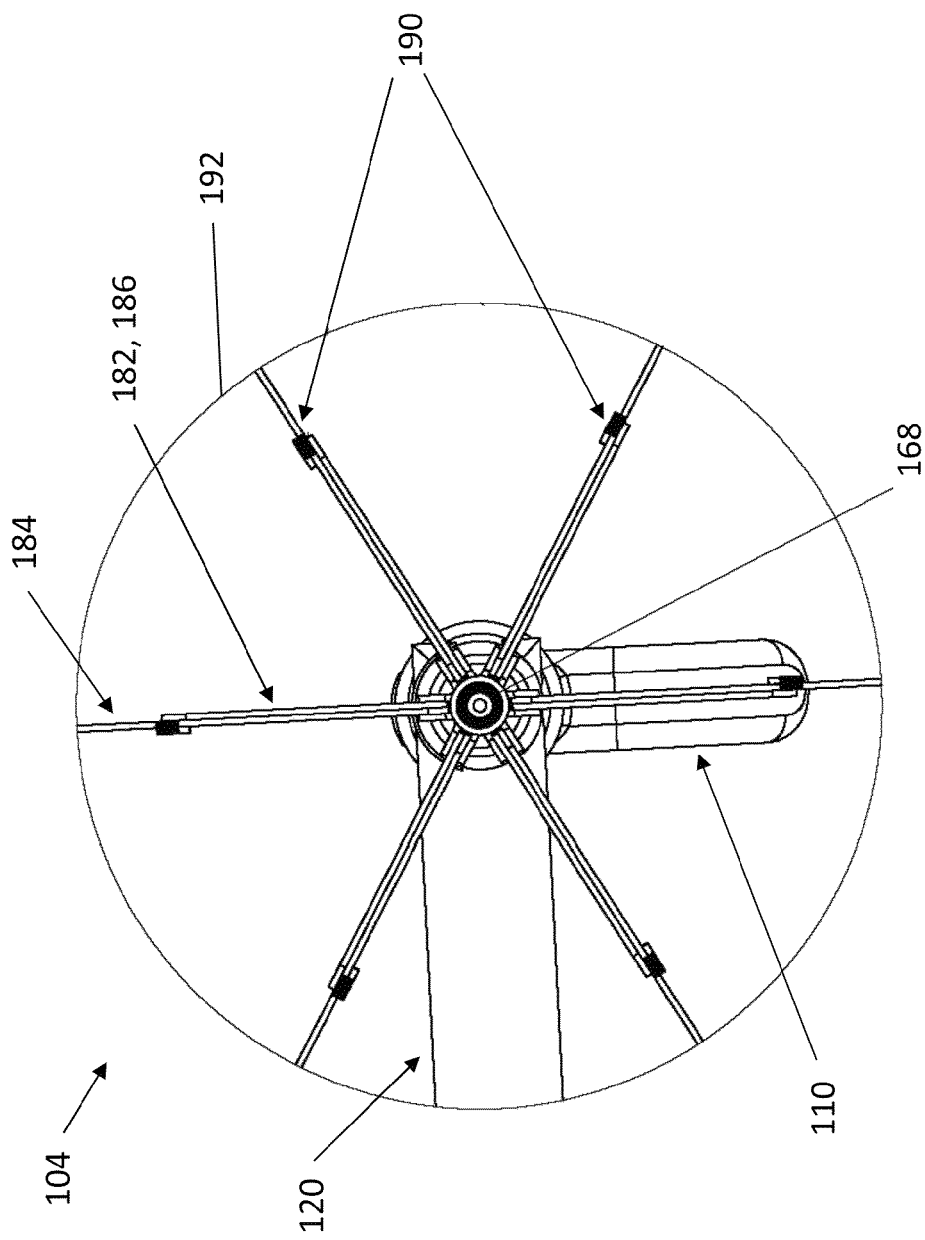
FIG. 3 is a bottom view of an embodiment of the device with deterrent structure in a deployed configuration.

FIG. 3 provides a bottom view of the device 100 with deterrent structure 180 in a deployed configuration. The device distal end 104 is shown with auxiliary grip handle 120 deployed and configured such that when deployed, the auxiliary grip handle 120 forms a perpendicular angle with the grip handle 110. Olfactory deterrent 168 is shown disposed at the confluence of the six (6) deterrent structure arms 182. Each of six (6) deterrent structure arms 182 comprise a deterrent structure arm outer end 184 and engage a respective deterrent structure linkage 186. FIG. 3 depicts an embodiment of the device 100 with electrical deterrent feature comprising electrical deterrent nodes 190 disposed at the approximate intersection of each of the six (6) deterrent structure arms 182 with respective deterrent structure linkage 186, and electrical deterrent ring 192.

FIGS. 4A-B provide greater detail of the device distal end 104. Specifically, FIG. 4A provides a partial perspective view of the distal portion of the device 104 with deterrent structure 180 in a deployed configuration. Deterrent structure 180 is shown comprising deterrent structure arms 182 with deterrent structure arms inner end 183 and deterrent structure arms outer end 184. Each of the six (6) deterrent structure arms 182 engage with a respective deterrent structure linkage 186. In one embodiment of the device 100, the deterrent structure arms facing edge 185 is a serrated edge, as depicted in detail B of FIG. 4B.

FIGS. 5A-B provide greater detail of the control handle 130 of the device 100. Specifically, FIG. 5A is a side view of an embodiment of the control handle 130 of the device 100 and FIG. 5B is a cross-sectional view of Section E-E of FIG. 5A. The control handle comprises a control handle proximal end 132, a control handle distal end 134 and a control handle electronic control button 136. The control handle electronic control button may control one or more of electrical deterrent, olfactory deterrent and audio deterrent. FIG. 5B depicts deterrent structure deployment button 144 which engages ratchet lever 142 which in turn engages ratchet 140. When deterrent structure deployment button 144 is pushed inwards, ratchet lever 142 rotates so as to release ratchet 140 which deploys deterrent structure in any of several means, as discussed below.

Figure 6A:
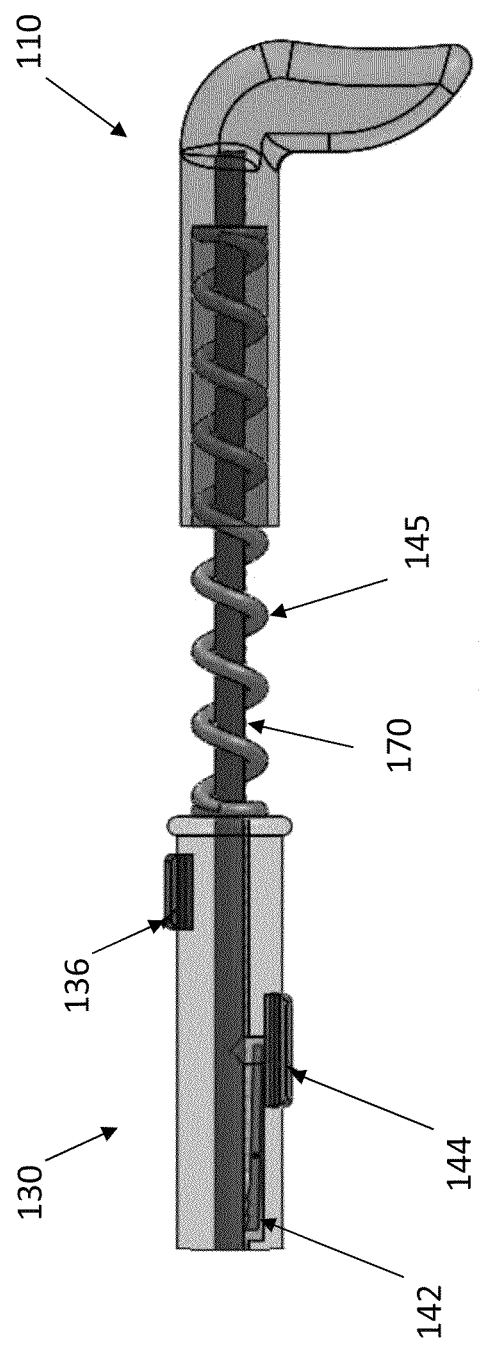
FIG. 6A is a partial side view of an embodiment of the proximal portion of the device showing interior side elements thereof.
Figure 6B:
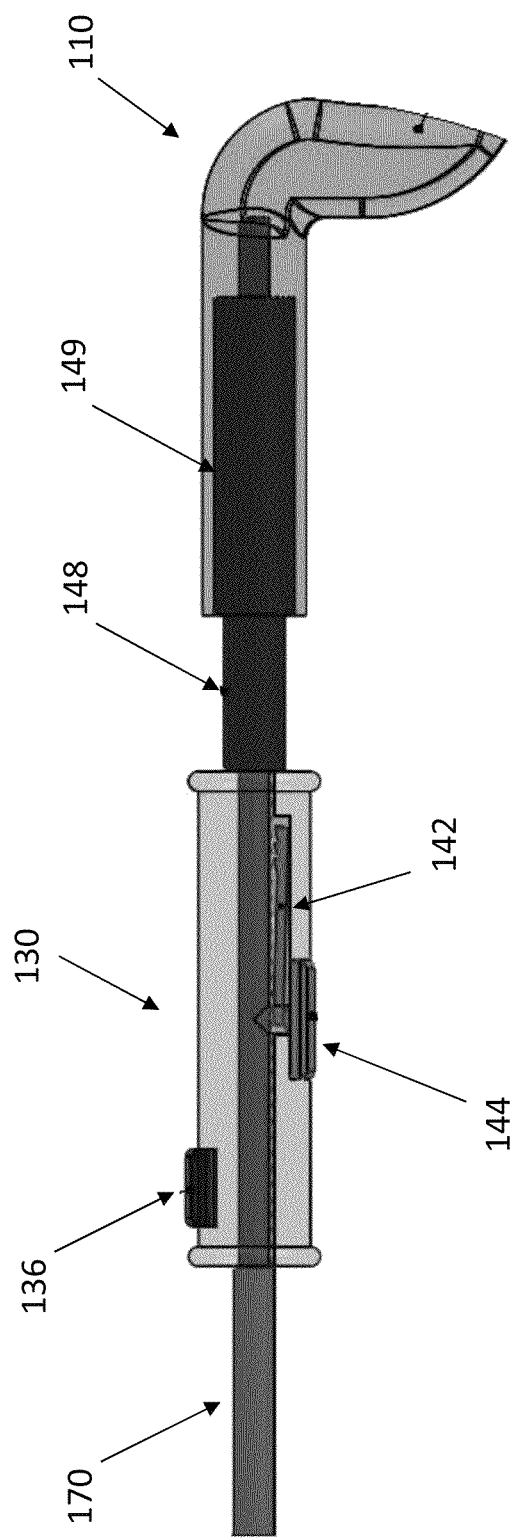
FIG. 6B is a partial side view of a further embodiment of the proximal portion of the device showing interior side elements thereof.
Figure 6C:
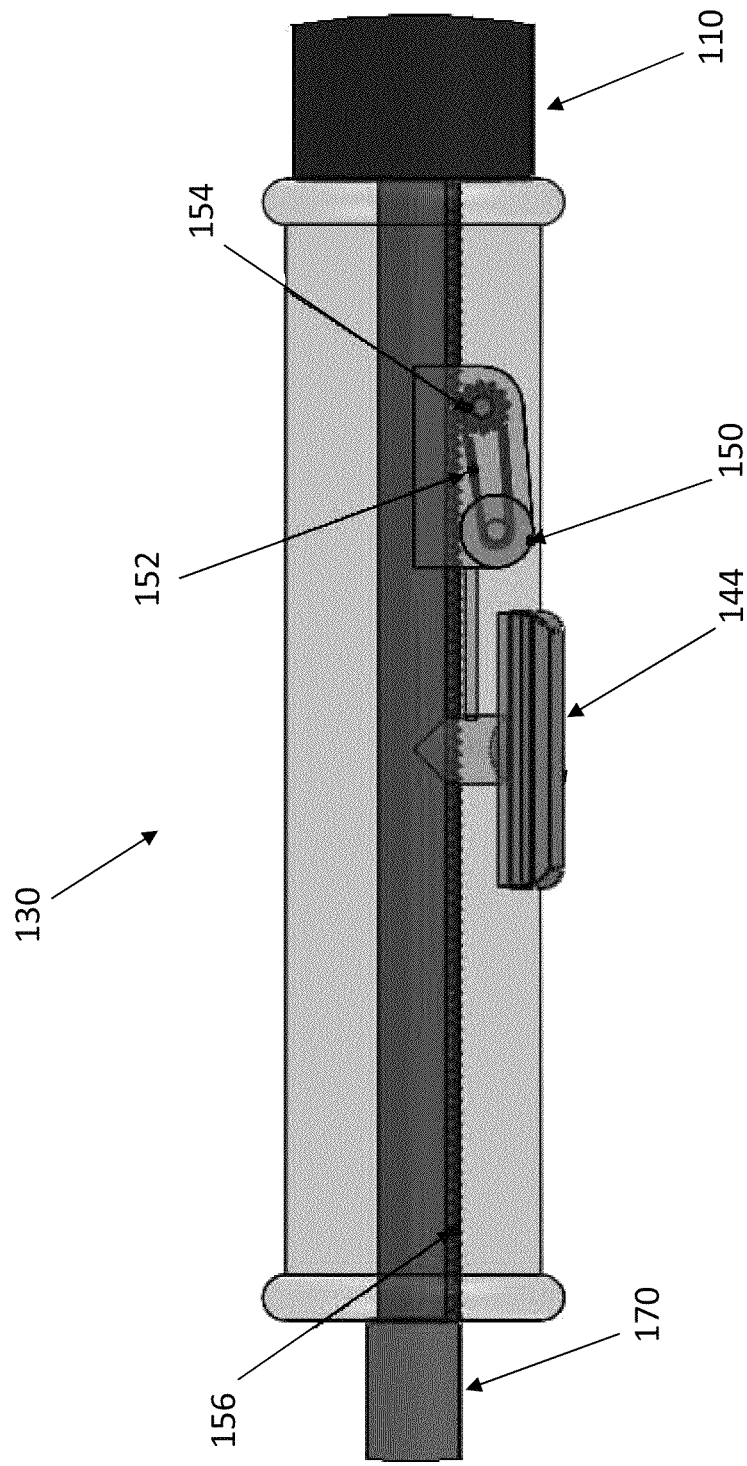
FIG. 6C is a partial side view of another further embodiment of the proximal portion of the device showing interior side elements thereof.

FIGS. 6A-C detail various means of effecting the deployment of the deterrent structure of the device as triggered by a user engaging, or pushing-in, the deterrent structure deployment button 144. FIG. 6A details a spring-loaded means of deploying the deterrent structure. More specifically, a coiled spring 145 is fitted to axially surround upper inner shaft 170 such that when a deterrent structure deployment button 144 is pushed inwards by a user, ratchet lever 142 rotates so as to release ratchet 140 which releases spring 145 therein separating grip handle 110 from control handle 130 (and thereby extending the length of the device 100) and/or deploying deterrent structure linkage which deploys the deterrent structure. FIG. 6B details a compressed air means of deploying the deterrent structure. More specifically, an air canister 148 is fitted to engage adjacent grip handle 110 such that when a deterrent structure deployment button 144 is pushed inwards by a user, ratchet lever 142 rotates so as to release ratchet 140 which triggers release of compressed air canister 148 therein actuating pneumatic actuator 149 therein separating grip handle 110 from control handle 130 (and thereby extending the length of the device 100) and/or deploying deterrent structure linkage which deploys deterrent structure. FIG. 6C details a motorized drive gear means of deploying the deterrent structure. More specifically, drive gear motor 150 via a drive belt 152 drives a drive spur gear 154 engaged with drive gear rack 156 such that when a deterrent structure deployment button 144 is pushed inwards by a user, drive gear motor 150 operates therein separating grip handle 110 from control handle 130 (and thereby extending the length of the device 100) and/or deploying deterrent structure linkage which deploys deterrent structure. Drive gear motor may be driven by a battery (not shown).

Figure 7A:
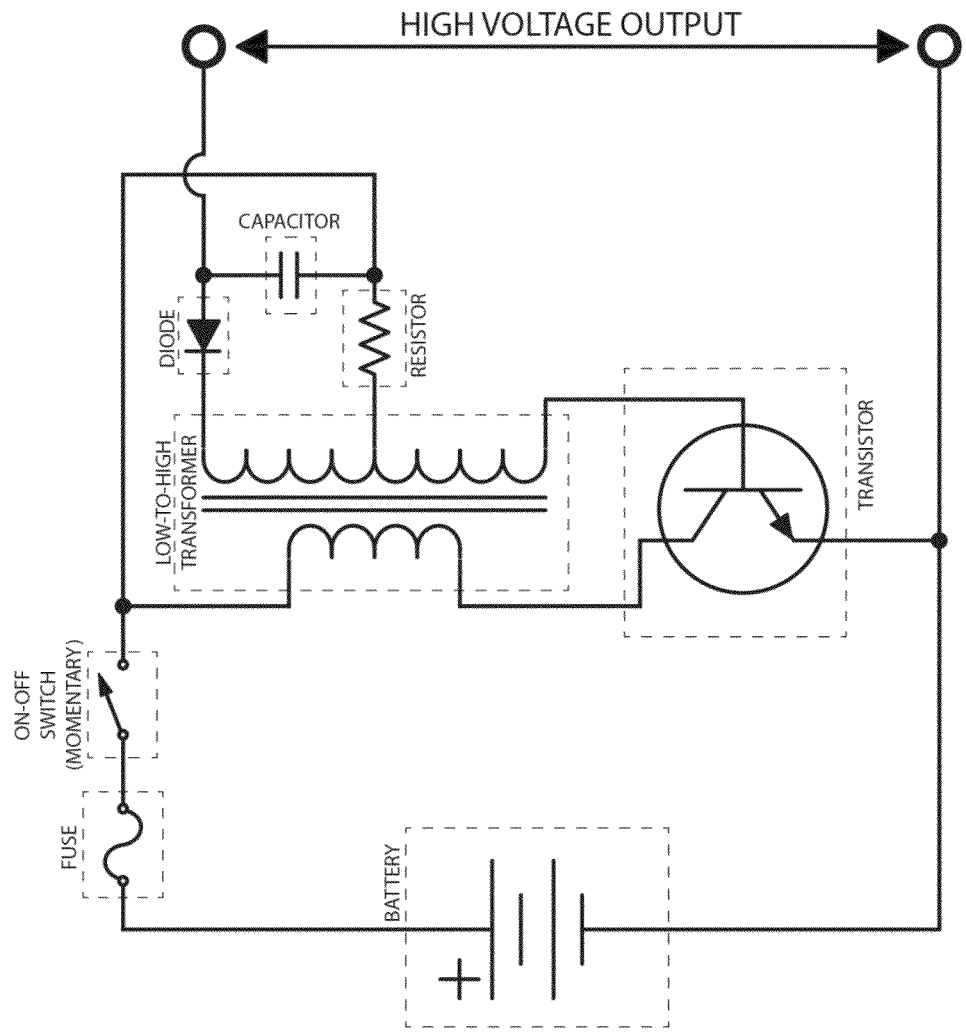
FIG. 7A is a schematic diagram of an embodiment of the electrical deterrent component of the device.
Figure 7B:
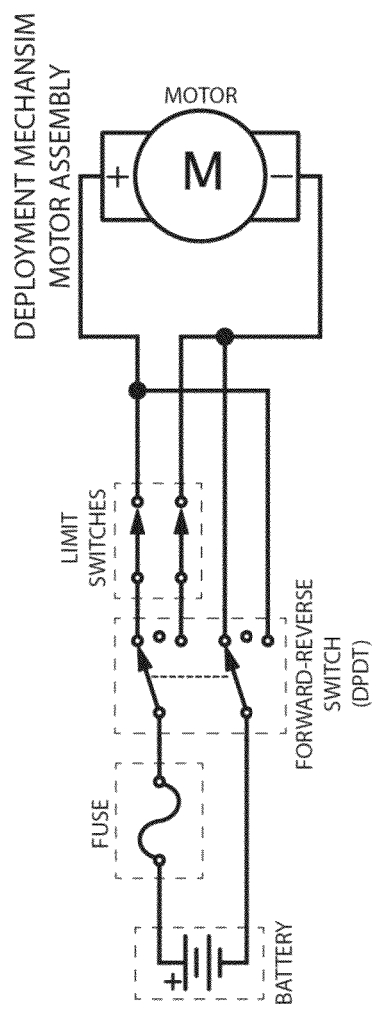
FIG. 7B is a schematic diagram of an embodiment of the motor deployment component of the device.
Figure 7C:
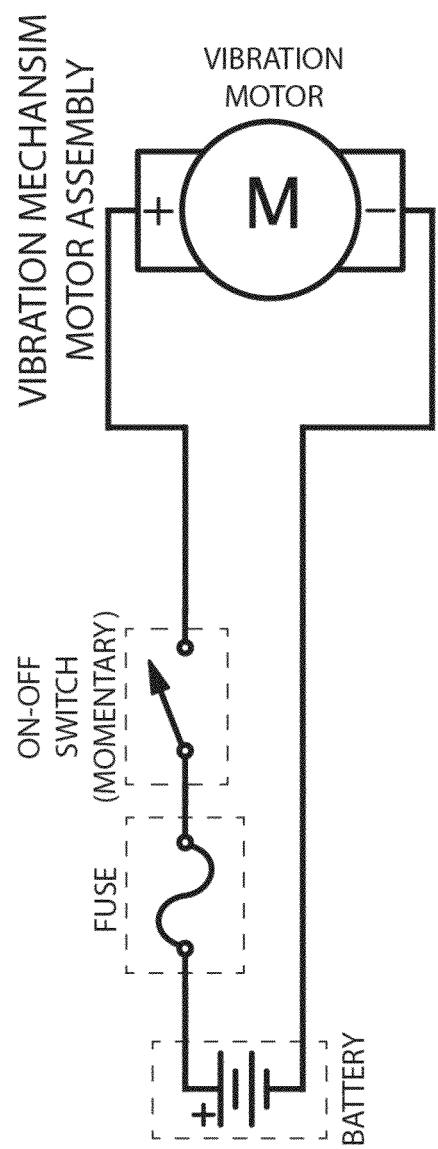
FIG. 7C is a schematic diagram of an embodiment of the vibration deterrent component of the device.
Figure 7D:
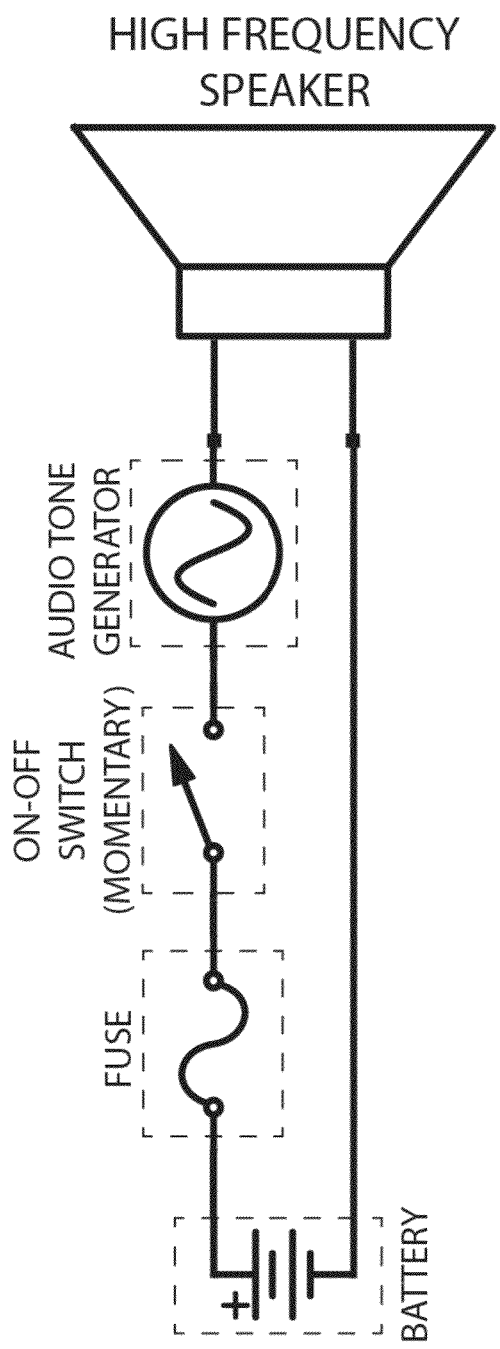
FIG. 7D is a schematic diagram of an embodiment of the high frequency audio deterrent component of the device.

FIGS. 7A-D provide electrical schematic diagrams of various components of the device 100. Specifically, FIG. 7A is an electrical schematic diagram of the electrical deterrent component of the device comprising battery, fuse, on/off switch, transformer, diode, resistor, capacitor and transistor such that a high voltage output may be provided as the electrical deterrent (such as that discussed with regard to FIG. 3). FIG. 7B is an electrical schematic diagram of the motorized drive gear means of deploying the deterrent structure (such as that discussed with regard to FIG. 6C) comprising a battery, fuse, forward/reverse switch, limit switches and motor. FIG. 7C is an electrical schematic diagram of the electrical deterrent component of the device comprising battery, fuse, on-off switch and vibration motor. FIG. 7D is an electrical schematic diagram of the audio deterrent of the device comprising battery, fuse, on-off switch, audio tone generator and high frequency speaker.

To lend further clarity to the Detailed Description provided herein in the associated drawings, the following list of components and associated numbering are provided:

| Reference No. | Component |
| --- | --- |
| 100 | Device |
| 102 | Device Proximal End |
| 104 | Device Distal End |
| 110 | Grip Handle |
| 120 | Auxiliary Grip Handle |
| 130 | Control Handle |
| 132 | Control Handle Proximal End |
| 134 | Control Handle Distal End |
| 136 | Control Handle Electronic Control Button |
| 140 | Ratchet |
| 142 | Ratchet Lever |
| 144 | Deterrent Structure Deployment Button |
| 145 | Spring |
| 148 | Air Canister |
| 149 | Pneumatic Actuator |
| 150 | Drive Gear Motor |
| 152 | Drive Belt |
| 154 | Drive Spur Gear |
| 156 | Drive Gear Rack |
| 160 | Outer Shaft |
| 162 | Outer Shaft Proximal End |
| 164 | Outer Shaft Distal End |
| 166 | Audio Deterrent |
| 168 | Olfactory Deterrent |
| 170 | Upper Inner Shaft |
| 172 | Lower Inner Shaft |
| 180 | Deterrent Structure |
| 182 | Deterrent Structure Arms |
| 183 | Deterrent Structure Arms Inner End |
| 184 | Deterrent Structure Arms Outer End |
| 185 | Deterrent Structure Arms Facing Edge |
| 186 | Deterrent Structure Linkage |
| 190 | Electrical Deterrent Nodes |
| 192 | Electrical Deterrent Ring |
| $A_1$ | Deterrent Structure Arms Position 1 |

-continued

| Reference No. | Component |
| --- | --- |
| $A_2$ | Deterrent Structure Arms Position 2 |
| $A_3$ | Deterrent Structure Arms Position 3 |
| $L_1$ | Deterrent Structure Linkage Position 1 |
| $L_2$ | Deterrent Structure Linkage Position 2 |
| $L_3$ | Deterrent Structure Linkage Position 3 |
| $\alpha$ | Deterrent Structure Sector Angle |

What is claimed is:

1. A self-protection device for use against an offending animal, comprising:
   a substantially hollow outer shaft having a proximal end and distal end;
   a control handle interconnected to the proximal end of the outer shaft, the control handle having a controller, a lower inner shaft slideably engaged axially with the distal end of the outer shaft; and
   a deterrent structure connected to the lower inner shaft and having a plurality of arms and linkages;
   wherein the controller has a first switch to activate the deterrent structure in at least one of two deterrent structure states including an electrified state and an unelectrified state, the lower inner shaft extending distally from the outer shaft upon activating the deterrent structure, and the arms expanding radially from the lower inner shaft upon activating the deterrent structure.

2. A self-protection device as claimed in claim 1, further comprising at least one of an audio deterrent, an olfactory deterrent and a vibration deterrent incorporated in the deterrent structure.

3. A self-protection device as claimed in claim 2, wherein the controller further activates at least one of the audio deterrent, olfactory deterrent and vibration deterrent incorporated in the deterrent structure.

4. A self-protection device as claimed in claim 3, wherein the audio deterrent is activated by the controller, the controller being configured to allow a user to select at least one of a volume and a frequency of the audio deterrent.

5. A self-protection device as claimed in claim 1, wherein the device comprises at least three arms connected to the lower inner shaft.

6. A self-protection device as claimed in claim 5, wherein the device comprises at least three linkages connected to the at least three arms.

7. A self-protection device as claimed in claim 1, wherein the device further comprises a ratchet connected to the control handle and engaged with the first switch.

8. A self-protection device as claimed in claim 1, wherein the device further comprises a gripping handle connected to the proximal end of the device.

9. A self-protection device as claimed in claim 1, wherein the deterrent structure deploys to a stationary position within five seconds once activated by the first switch.

10. A self-protection device as claimed in claim 1, wherein the deterrent structure when deployed forms a radius of at least two feet from the axial center of the outer shaft.

11. A self-protection device as claimed in claim 1, wherein the arms include a serrated edge portion disposed along a distal edge of the arms.

12. A self-protection device as claimed in claim 1, wherein the device further comprises a battery for providing power to deploy the deterrent structure.

13. A self-protection device as claimed in claim 1, wherein the device further comprises an auxiliary handle connected to an upper inner shaft slidably engaged axially with the proximal end of the outer shaft and configured to deploy to a substantially perpendicular position relative to the outer shaft when the deterrent structure is deployed.

14. A self-protection device as claimed in claim 1, wherein the device is manufactured of materials comprising metal, metal alloys, and composites.

15. A method of using a self-protection device for a user against an offending animal, comprising:
    providing a self-protection device, the device comprising:
        a substantially hollow outer shaft having a proximal end and distal end;
        a control handle interconnected to the proximal end of the outer shaft, the control handle having a controller, a lower inner shaft slideably engaged axially with the distal end of the outer shaft; and
        a deterrent structure connected to the lower inner shaft and having a plurality of arms and linkages, wherein the controller has a first switch to activate the deterrent structure in at least one of two deterrent structure states including an electrified state and an unelectrified state, the lower inner shaft extending distally from the outer shaft upon activating the deterrent structure, and the arms expanding radially from the lower inner shaft upon activating the deterrent structure;
    positioning the distal end of the device toward an offending animal;
    deploying the deterrent structure by engaging the first switch of the control handle of the device;
    pointing the deployed deterrent structure at the offending animal;
    wherein when the deterrent structure is deployed and pointed toward an offending animal, the animal is deterred from offending the user.

16. The method of claim 15, further including providing an auxiliary handle configured to deploy to a substantially perpendicular position relative to the outer shaft when the deterrent structure is deployed, and grasping the deployed auxiliary handle when pointing the deployed deterrent structure at the offending animal.

17. The method of claim 15, further including providing at least one of an audio deterrent, an olfactory deterrent and a vibration deterrent, wherein the controller further activates at least one of the audio deterrent, olfactory deterrent and vibration deterrent.

18. A self-protection device for a user against an offending animal, comprising:
    a substantially hollow outer shaft having a proximal end and distal end;
    a control handle interconnected to the proximal end of the outer shaft, the control handle having a controller, a lower inner shaft slideably engaged axially with the distal end of the outer shaft;
    a gripping handle, the gripping handle disposed adjacent the control handle;
    an auxiliary handle configured to deploy to a substantially perpendicular position relative to the outer shaft when the deterrent structure is deployed;
    a deterrent structure connected to the lower inner shaft and comprising at least a pair of paired structure arms and structure linkages, the structure linkages urging the structure linkages to expand radially from the lower inner shaft upon the user activating the deterrent structure;
    a lower inner shaft interconnected to the distal end of the outer shaft, the lower inner shaft slideably engaged axially with the outer shaft, the lower inner shaft extending distally from the outer shaft upon the user activating the deterrent structure; and
    an audio deterrent activated by the controller, the controller configured to allow a user to select at least one of a volume and a frequency of the audio deterrent;
    wherein the controller has a first switch to activate the deterrent structure in at least one of two deterrent structure states including an electrified state and an unelectrified state, the lower inner shaft extending distally from the outer shaft upon activating the deterrent structure, and the arms expanding radially from the lower inner shaft upon activating the deterrent structure;
    wherein when the deterrent structure is deployed and oriented toward an offending animal, the animal is deterred from offending the user.

19. A self-protection device as claimed in claim 18, wherein the deterrent structure deploys to a stationary position within five seconds once activated by the first switch, wherein the deployed deterrent structure forms a radius of at least two feet from the axial center of the outer shaft, wherein the structure arms comprise a serrated edge portion, and wherein the is manufactured of materials comprising metal, metal alloys, and composites.

20. A self-protection device as claimed in claim 19, wherein the device further comprises a battery, the battery configured to enable the deployment of the deterrent structure, and the device further comprises at least one of a deployment means interconnected with the control handle, the deployment means selected from the group consisting of a ratchet, an air charge and a drive gear.

* * * * *